(12) United States Patent
Onozawa (10) Patent No.: US 7,839,448 B2
(45) Date of Patent: Nov. 23, 2010

(54) CAMERA APPARATUS HAVING A PLURALITY OF IMAGE PICKUP ELEMENTS

(75) Inventor: Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 801 days.

(21) Appl. No.: 11/502,753

(22) Filed: Aug. 11, 2006

(65) Prior Publication Data
US 2007/0052835 A1   Mar. 8, 2007

(30) Foreign Application Priority Data
Sep. 7, 2005   (JP)   ............................... 2005-259429

(51) Int. Cl.
*G03B 13/00* (2006.01)
*H04N 5/232* (2006.01)
(52) U.S. Cl. .................... 348/347; 348/350; 348/351
(58) Field of Classification Search .................. None
See application file for complete search history.

(56) References Cited

U.S. PATENT DOCUMENTS

| 4,558,367 | A  | * | 12/1985 | Urata et al. ................. 348/350 |
| 6,529,640 | B1 | * | 3/2003  | Utagawa et al. ............. 382/284 |
| 6,639,626 | B1 | * | 10/2003 | Kubo et al. ................. 348/218.1 |
| 7,206,136 | B2 | * | 4/2007  | Labaziewicz et al. ....... 359/676 |
| 2001/0010556 | A1 | * | 8/2001 | Sugimoto et al. ........... 348/345 |
| 2003/0020814 | A1 | * | 1/2003 | Ono ........................ 348/220.1 |
| 2003/0063322 | A1 | * | 4/2003 | Itoh et al. .................... 358/302 |
| 2003/0160886 | A1 | * | 8/2003 | Misawa et al. .............. 348/347 |
| 2005/0012846 | A1 | * | 1/2005 | Shinohara .................... 348/345 |
| 2005/0068453 | A1 | * | 3/2005 | Sasakura .................... 348/335 |
| 2005/0104992 | A1 | * | 5/2005 | Aoyama et al. ............. 348/345 |
| 2005/0128323 | A1 | * | 6/2005 | Choi ......................... 348/239 |
| 2005/0195310 | A1 | * | 9/2005 | Yajima et al. ............... 348/345 |

FOREIGN PATENT DOCUMENTS

| JP | 10-290389 A     | 10/1998 |
| JP | 2001-333324 A   | 11/2001 |
| JP | 2002-077711 A   | 3/2002  |
| JP | 2003-259186 A   | 9/2003  |
| KR | 10-1993-0007228 A | 4/1993 |

* cited by examiner

*Primary Examiner*—Jason Whipkey
*Assistant Examiner*—Dennis Hogue
(74) *Attorney, Agent, or Firm*—Holtz, Holtz, Goodman & Chick, PC (57) ABSTRACT

When the mode is set to a pan focus mode, the imaging apparatus according to the present invention displays types of a shooting scene in an image display section 15 (S1), judges whether or not the user has designated the shooting scene (S2), acquires two focus positions corresponding to the thus designated shooting scene when it judges that the shooting scene is designated, and moves the CCD 6 and the CCD 7 to the thus acquired two focus positions (S3). Next, the imaging apparatus synthesizes image data picked up by the CCD 6 and the CCD 7, displays the thus synthesized image data as through image (S4), and acquires two focus positions corresponding to the lens position of the zoom lens every time a zoom operation is performed, and moves the CCD 6 and the CCD 7 (S5 to S8).

15 Claims, 9 Drawing Sheets

FIG. 2

| ZOOM LENS POSITION / SHOOT SCENE | | ZOOM 1 | ZOOM 2 | ZOOM 3 | ZOOM 4 | ZOOM 5 | ZOOM 6 | ZOOM 7 |
|---|---|---|---|---|---|---|---|---|
| LAND-SCAPE | E1 | 3.3m TO 7.0m | XX m TO YY m | XX m TO YY m | XX m TO YY m | XX m TO YY m | XX m TO YY m | XX m TO YY m |
|  | E2 | 6.0m TO ∞ m | XX m TO YY m | XX m TO YY m | XX m TO YY m | XX m TO YY m | XX m TO YY m | XX m TO YY m |
| LAND-SCAPE AND PERSON | E1 | 2.8m TO 5.0m | XX m TO YY m | XX m TO YY m | XX m TO YY m | XX m TO YY m | XX m TO YY m | XX m TO YY m |
|  | E2 | 6.0m TO ∞ m | XX m TO YY m | XX m TO YY m | XX m TO YY m | XX m TO YY m | XX m TO YY m | XX m TO YY m |
| FLOWER AND LAND-SCAPE | E1 | 0.4m TO 0.5m | XX m TO YY m | XX m TO YY m | XX m TO YY m | XX m TO YY m | XX m TO YY m | XX m TO YY m |
|  | E2 | 6.0m TO ∞ m | XX m TO YY m | XX m TO YY m | XX m TO YY m | XX m TO YY m | XX m TO YY m | XX m TO YY m |
| ...... |  | ...... | ...... | ...... | ...... | ...... | ...... | ...... |

E1 : IMAGE PICKUP ELEMENT 1   E2 : IMAGE PICKUP ELEMENT 2

| TYPE OF FOCUS | ZOOM LENS POSITION | ZOOM 1 | ZOOM 2 | ZOOM 3 | ZOOM 4 | ZOOM 5 | ZOOM 6 | ZOOM 7 |
|---|---|---|---|---|---|---|---|---|
| NEAR-VIEW FOCUS PRIORITY | E 1 | 1.0m TO 4.9m | 1.2m TO 5.0m | 1.5m TO 5.0m | 1.8m TO 4.9m | 2.1m TO 5.0m | 2.0m TO 4.9m | 2.6m TO 4.8m |
|  | E 2 | XX m TO ∞ m | XX m TO ∞ m | XX m TO ∞ m | XX m TO ∞ m | XX m TO ∞ m | XX m TO ∞ m | XX m TO ∞ m |
| DISTANT-VIEW FOCUS PRIORITY (WITH OPEN APERTURE) | E 1 | 1.4m TO ∞ m | 1.7m TO ∞ m | 2.2m TO ∞ m | 2.7m TO ∞ m | 3.5m TO ∞ m | 4.2m TO ∞ m | 5.1m TO ∞ m |
|  | E 2 | XX m TO ∞ m | XX m TO ∞ m | XX m TO ∞ m | XX m TO ∞ m | XX m TO ∞ m | XX m TO ∞ m | XX m TO ∞ m |
| DISTANT-VIEW FOCUS PRIORITY (WITH CLOSED APERTURE) | E 1 | 0.9m TO ∞ m | 1.0m TO ∞ m | 1.4m TO ∞ m | 1.8m TO ∞ m | 2.4m TO ∞ m | 3.0m TO ∞ m | 3.7m TO ∞ m |
|  | E 2 | XX m TO ∞ m | XX m TO ∞ m | XX m TO ∞ m | XX m TO ∞ m | XX m TO ∞ m | XX m TO ∞ m | XX m TO ∞ m |

E1 : IMAGE PICKUP ELEMENT 1    E2 : IMAGE PICKUP ELEMENT 2

| ZOOM LENS POSITION / TYPE OF FOCUS | | ZOOM 1 | ZOOM 2 | ZOOM 3 | ZOOM 4 | ZOOM 5 | ZOOM 6 | ZOOM 7 |
|---|---|---|---|---|---|---|---|---|
| NEAR-VIEW FOCUS PRIORITY | E1 | 0.7m TO 1.5m, 1.0m TO 4.0m AND 3.0m TO 10.0m | 0.9m TO 2.0m, 1.2m TO 4.3m AND 1.5m TO 8.2m | 1.1m TO 2.2m, 1.5m TO 4.6m AND 1.9m TO 9.8m | 1.3m TO 2.3m, 2.0m TO 5.0m AND 2.5m TO 10.0m | 1.6m TO 2.8m, 2.3m TO 5.0m AND 3.0m TO 10.0m | 1.8m TO 2.9m, 2.6m TO 5.2m AND 3.6m TO 10.0m | 2.0m TO 3.0m, 2.8m TO 5.0m AND 4.0m TO 10.0m |
| | E2 | XX m TO YY m, XX m TO YY m AND XX m TO YY m | XX m TO YY m, XX m TO YY m AND XX m TO YY m | XX m TO YY m, XX m TO YY m AND XX m TO YY m | XX m TO YY m, XX m TO YY m AND XX m TO YY m | XX m TO YY m, XX m TO YY m AND XX m TO YY m | XX m TO YY m, XX m TO YY m AND XX m TO YY m | XX m TO YY m, XX m TO YY m AND XX m TO YY m |
| DISTANT-VIEW FOCUS PRIORITY (WITH OPEN APERTURE) | E1 | 0.8m TO 2.0m, 1.2m TO 5.6m AND 1.6m TO ∞ m | 0.9m TO 2.0m, 1.4m TO 5.6m AND 1.8m TO ∞ m | 1.2m TO 2.2m, 1.6m TO 4.6m AND 2.5m TO ∞ m | 1.3m TO 2.3m, 2.0m TO 5.0m AND 3.3m TO ∞ m | 1.6m TO 2.8m, 2.3m TO 5.0m AND 4.2m TO ∞ m | 2.0m TO 3.3m, 2.9m TO 6.4m AND 5.2m TO ∞ m | 2.4m TO 3.9m, 3.4m TO 7.3m AND 6.3m TO ∞ m |
| | E2 | XX m TO YY m, XX m TO YY m AND XX m TO YY m | XX m TO YY m, XX m TO YY m AND XX m TO YY m | XX m TO YY m, XX m TO YY m AND XX m TO YY m | XX m TO YY m, XX m TO YY m AND XX m TO YY m | XX m TO YY m, XX m TO YY m AND XX m TO YY m | XX m TO YY m, XX m TO YY m AND XX m TO YY m | XX m TO YY m, XX m TO YY m AND XX m TO YY m |
| DISTANT-VIEW FOCUS PRIORITY (WITH CLOSED APERTURE) | E1 | 0.5m TO 1.3m, 0.7m TO 3.8m AND 0.9m TO ∞ m | 0.6m TO 1.3m, 0.8m TO 2.8m AND 1.1m TO ∞ m | 0.7m TO 1.4m, 1.0m TO 3.0m AND 1.5m TO ∞ m | 0.8m TO 1.3m, 1.1m TO 2.6m AND 2.0m TO ∞ m | 1.0m TO 1.6m, 1.5m TO 3.2m AND 2.5m TO ∞ m | 1.2m TO 2.0m, 0.7m TO 4.0m AND 3.2m TO ∞ m | 1.5m TO 2.3m, 2.2m TO 4.6m AND 3.9m TO ∞ m |
| | E2 | XX m TO YY m, XX m TO YY m AND XX m TO YY m | XX m TO YY m, XX m TO YY m AND XX m TO YY m | XX m TO YY m, XX m TO YY m AND XX m TO YY m | XX m TO YY m, XX m TO YY m AND XX m TO YY m | XX m TO YY m, XX m TO YY m AND XX m TO YY m | XX m TO YY m, XX m TO YY m AND XX m TO YY m | XX m TO YY m, XX m TO YY m AND XX m TO YY m |

E1 : IMAGE PICKUP ELEMENT 1    E2 : IMAGE PICKUP ELEMENT 2

CAMERA APPARATUS HAVING A PLURALITY OF IMAGE PICKUP ELEMENTS

CROSS-REFERENCE TO RELATED APPLICATION

This application is based upon and claims the benefit of priority from the prior Japanese Patent Application No. 2005-259429, filed 7 Sep. 7, 2005, the entire contents of which is incorporated herein by reference.

BACKGROUND OF THE INVENTION

1. Field of the Invention

The present invention relates to an imaging apparatus and a program therefore, and particularly, to an imaging apparatus and a program therefore for performing focus processing onto an object using a plurality of image pickup elements.

2. Description of the Related Art

Recently, imaging apparatuses, for example, digital cameras, having a plurality of image pickup elements become more and more popular.

With this increased popularity, an art has been developed (in Japanese Patent Laid-Open Publication No. 2003-259186). In this art, when adjusting a focus on an object, a user individually changes optical path lengths of light of an object image projected to respective image pickup elements, thereby acquiring image data in focus on a plurality of objects, and the thus acquired image data are synthesized, whereby single image data in focus on the plurality of objects with different object positions is acquired.

In this art, however, since the user manually changes optical path lengths of light of an object image projected to the respective image pickup elements while looking at through image, the user has to adjust a focus for each image pickup element. This leads to a problem that this operation takes time and effort and it is trouble some.

In addition, the user adjusts a focus on the object for each image pickup element. This leads to a problem that a time required for adjusting a focus on the object increases in proportion to the number of the image pickup elements.

Furthermore, the user manually adjusts a focus while looking at through image. This leads to a problem that an accurate focus is not achieved on the object to shoot.

SUMMARY OF THE INVENTION

The present invention has been made in light of the foregoing issues.

In accordance with an aspect of the present invention, there is provided an imaging apparatus comprising: a plurality of image pickup elements for imaging an object; an optical path length change means for changing respective optical path lengths of respective light of an object image incident to the plurality of image pickup elements; an acquisition means for acquiring a plurality of different focus position information; and a focus control means for focusing on an object by controlling the changing of the optical path lengths of respective light of an object image incident to the plurality of image pickup elements performed by the optical path length change means, based on the plurality of different focus position information acquired by the acquisition means.

In accordance with another aspect of the present invention, there is provided an imaging apparatus comprising: a plurality of image pickup elements for imaging the object; a contrast detection means for changing an optical path length of light of an object image incident to the image pickup elements, and detecting the AF evaluation values at a plurality of focus points at the respective optical path lengths based on image data outputted by the image pickup elements, thereby detecting the focus position at the respective focus points; and a focus control means for performing auto focus on the object by controlling the optical path lengths of the respective light incident to the plurality of image pickup elements such that the respective optical path lengths become the focus positions at the respective focus points detected by the contrast detection means.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 9 shows a state of a table in a modification.

DETAILED DESCRIPTION OF THE PREFERRED EMBODIMENTS

Hereinafter, the preferred embodiments of the present invention will be described with reference to the drawings as an example of application of an imaging apparatus of the present invention to a digital camera.

A. First Embodiment

A-1. Configuration of the Digital Camera

Figure 1:
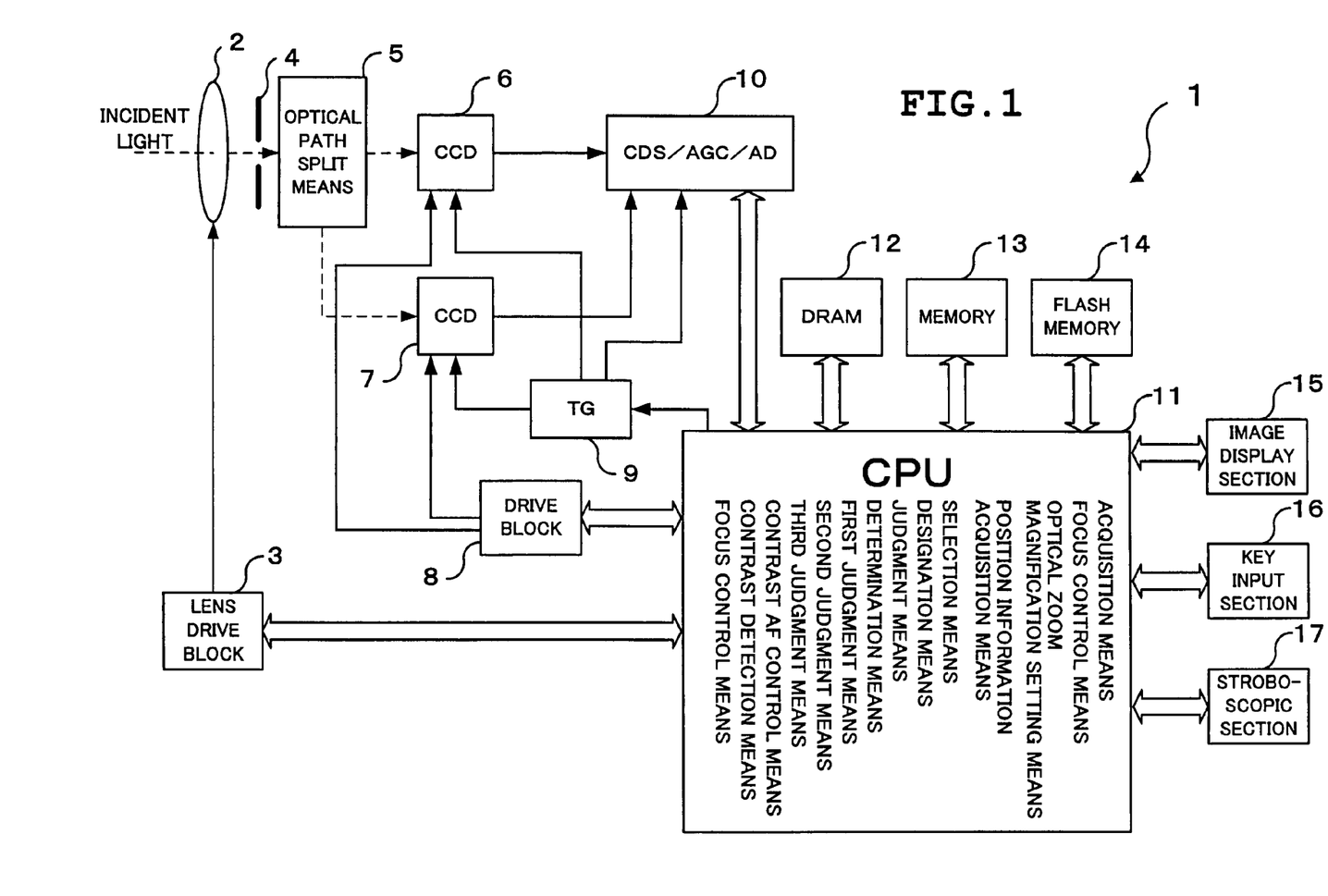
FIG. 1 is a block diagram of a digital camera in embodiments of the present invention.

FIG. 1 is a block diagram showing the general electrical outline configuration of a digital cameral 1 which actualizes the imaging apparatus of the present invention.

The digital camera 1 includes an image pickup lens 2, a lens drive block 3, an aperture/shutter combination 4, an optical path split means 5, a CCD 6, a CCD 7, a drive block 8, a timing generator (TG) 9, a unit circuit 10, a CPU 11, a DRAM 12, a memory 13, a flash memory 14, an image display section 15, a key input section 16 and a stroboscopic section 17.

The image pickup lens 2 includes a zoom lens, not shown, and is connected to the lens drive block 3. The lens drive block 3 is configured with a motor for driving the zoom lens, not shown, in the optical axis direction, and a motor driver for driving the motor according to control signals from the CPU 11.

The aperture/shutter combination 4, which includes a driver circuit, not shown, operates the aperture/shutter combination according to control signals sent from the CPU 11. The aperture/shutter combination functions as both an aperture and a shutter.

The aperture functions as the mechanism to control the quantity of light incident from the image pickup lens 2. The shutter functions as the mechanism to control the time duration for applying light to the CCD 6 and the CCD 7. The time duration for applying light to the CCD 6 and the CCD 7 changes according to the opening and closing speed of the shutter (shutter speed). Thus, an exposure can be determined according to the aperture and the shutter speed.

The optical path split means 5 is configured with an optical element, such as a prism or a half mirror, for splitting a photography light flux. Each of the split photography light flux is projected to the CCD 6 and the CCD 7, respectively.

The CCD 6 and the CCD 7 (the image pickup elements) photo-electrically convert the light of an object image projected through the image pickup lens 2 and the optical path split means 5, and outputs a light signal as an image pickup signal to the unit circuit 10, respectively. In addition, the CCD 6 and the CCD 7 are driven according to a timing signal of a predetermined frequency generated by the TG 9.

The drive block 8 includes the motor and the motor driver for moving the CCD 6 and the CCD 7 in the optical axis direction, respectively. The drive block 8 moves the CCD 6 and the CCD 7 separately in the optical axis direction, according to the control signals sent from the CPU 11. In other words, it changes an optical path length of light of an object image incident to the CCD 6, an optical path length of light of an object image incident to the CCD 7, respectively. This enables acquiring image data which is in focus on different objects by moving the CCD 6 and the CCD 7 in the optical axis direction, respectively.

The unit circuit 10, connected to the TG 9, is configured with a correlated double sampling (CDS) circuit for performing correlated double sampling of imaging signals (image data) that are respectively outputted from the CCD 6 and the CCD 7 and holding them, an automatic gain control (AGC) circuit for performing automatic gain control of the sampled imaging signals, and an analog to digital (A/D) converter for converting the automatic-gain-controlled analog signals. The imaging signals of the CCD 6 and the CCD 7 are respectively sent as digital signals to the CPU 11 via the unit circuit 10.

The CPU 11 is a one-chip microcomputer, having functions of performing image processing (including pixel interpolation processing, gamma correction processing, generation of luminosity color difference signals, white balance processing, and exposure compensation or the like) to the image data sent from the unit circuit 10, compression and expansion processing of the image data (for example, compression and expansion of the joint photographic experts group (JPEG) format and the moving picture experts group (MPEG) format) and focus processing, as well as controlling each section of the digital camera 1. In addition, the CPU 11 includes a clock circuit which not only times the data and time, but also functions as a timer.

In the memory 13, a control program required for controlling each section of the CPU 11 (for example, a control program required for focus processing) has been recorded, and the CPU 11 operates according to the program.

In addition, the memory 13 stores a pan focus position table in which the focus positions of the CCD 6 and the CCD 7 corresponding to the respective shooting scenes are recorded.

Figure 2:
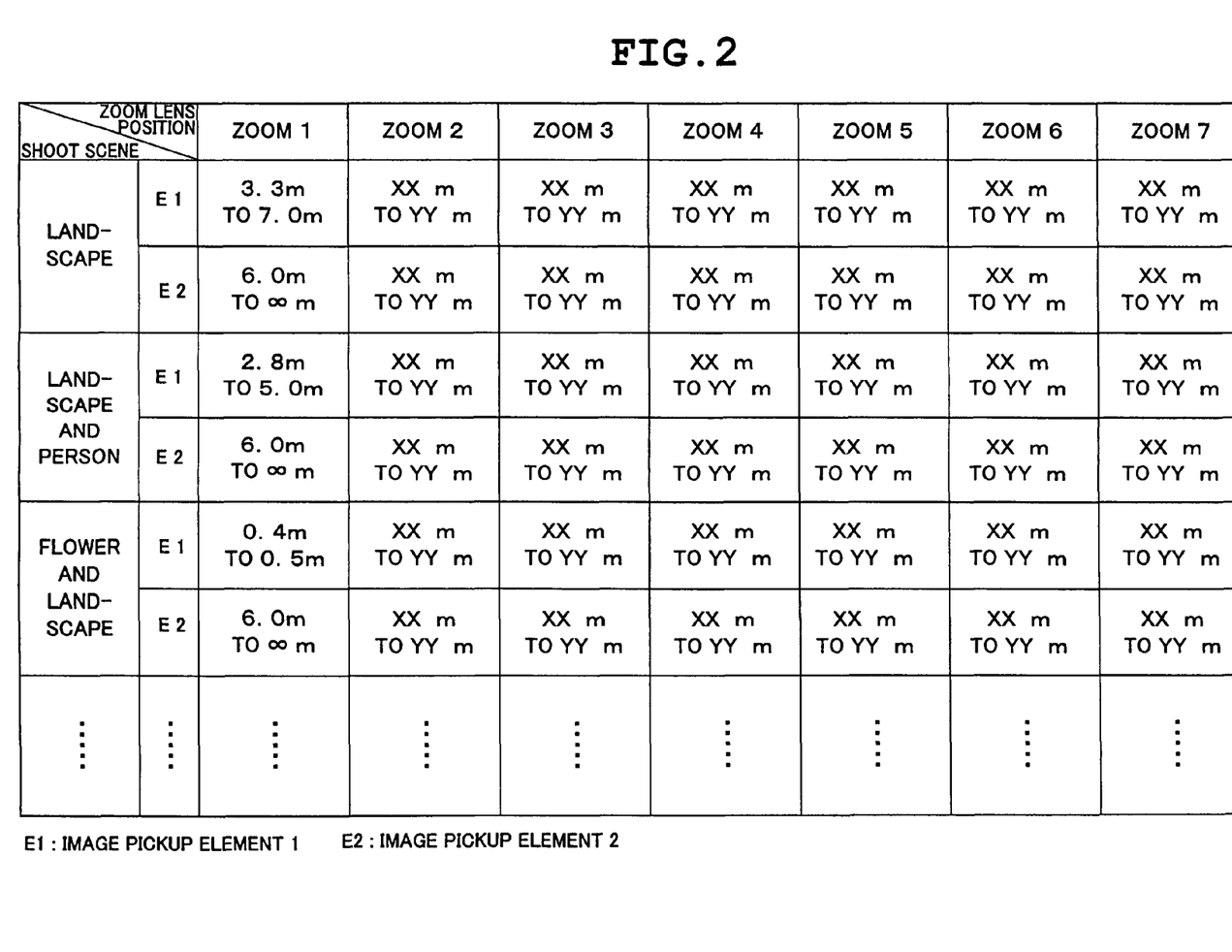
FIG. 2 shows a state of a pan focus position table stored in a memory 13.

FIG. 2 shows a state of the pan focus position table, in which the focus positions of the CCD 6 and the CCD 7 corresponding to the respective shooting scenes are stored.

In FIG. 2, the expression in each frame for each focus position should be preceded with the words "FOCUS POSITION WITH DEPTH OF FIELD . . . ," for example, "FOCUS POSITION WITH DEPTH OF FIELD OF 3.3 m TO 7.0 m." However, in order to prevent overcrowding in the drawing, each respective focus position has been abbreviated, such as "3.3 m TO 7.0 m," "XX m TO YY m," etc. This same annotation method is also used in FIG. 4 and FIG. 9.

As apparent from FIG. 2, the lens positions of the zoom lens is divided into Zoom 1, Zoom 2, to Zoom 7. Zoom 1 refers to a stage of a state in which zooming is not performed and a state in which zooming is hardly performed (i.e., a zoom magnification is approximately 1 time), and Zoom 7 refers to a stage in which zooming is fully performed (i.e., the zoom magnification is almost the maximum).

Focus positions of pan focus, that is, the positions of the CCD 6 and the CCD 7 are determined inevitably by the type of the shooting scenes and the lens position of the zoom lens.

For example, in the case where the shooting scene is a "landscape and person" and the lens position of the zoom lens is Zoom 1, the focus position of one of the CCDs is a focus position at which a depth of field is 2.8 m to 5.0 m (i.e., the focus position at which the focus is on the person), and the focus position of the other CCD is a focus position at which a depth of field is 6.0 m to ∞ m (i.e., the focus position at which the focus is on the landscape).

The DRAM 12 is used as a buffer memory for temporarily storing the image data picked up by the CCD 6 and the CCD 7 and subsequently sent to the CPU 11, as well as used as a working memory for the CPU 11.

The flash memory 14 is a record medium for storing the image data or the like that are picked up by the CCD 6 and the CCD 7 and synthesized.

The display section 15 includes a color liquid crystal display (LCD) and a driver circuit therefore. It displays the object picked up by the CCD 6 and the CCD 7 as through image in the shooting stand-by state, and displays recorded image data which are read out from the flash memory 14 for storage and are expanded during reproduction.

The key input section 16, including a plurality of operation keys such as a shutter button, a mode selection key, a plus (+) key, a SET key and a zoom key ("W" key and "T" key), outputs the operational signals corresponding to the key operation by the user to the CPU 11.

The stroboscopic section 17 flashes strobe light according to the control signals from the CPU 11. When it is judged that the CPU 11 judges that the photography state is dark based on brightness components of the signal outputted from the CCD 6 and the CCD 7 or the photometry circuit, now shown, the CPU 11 sends the control signal to the stroboscopic section 17.

A-2. Operation of the Digital Camera 1

Figure 3:
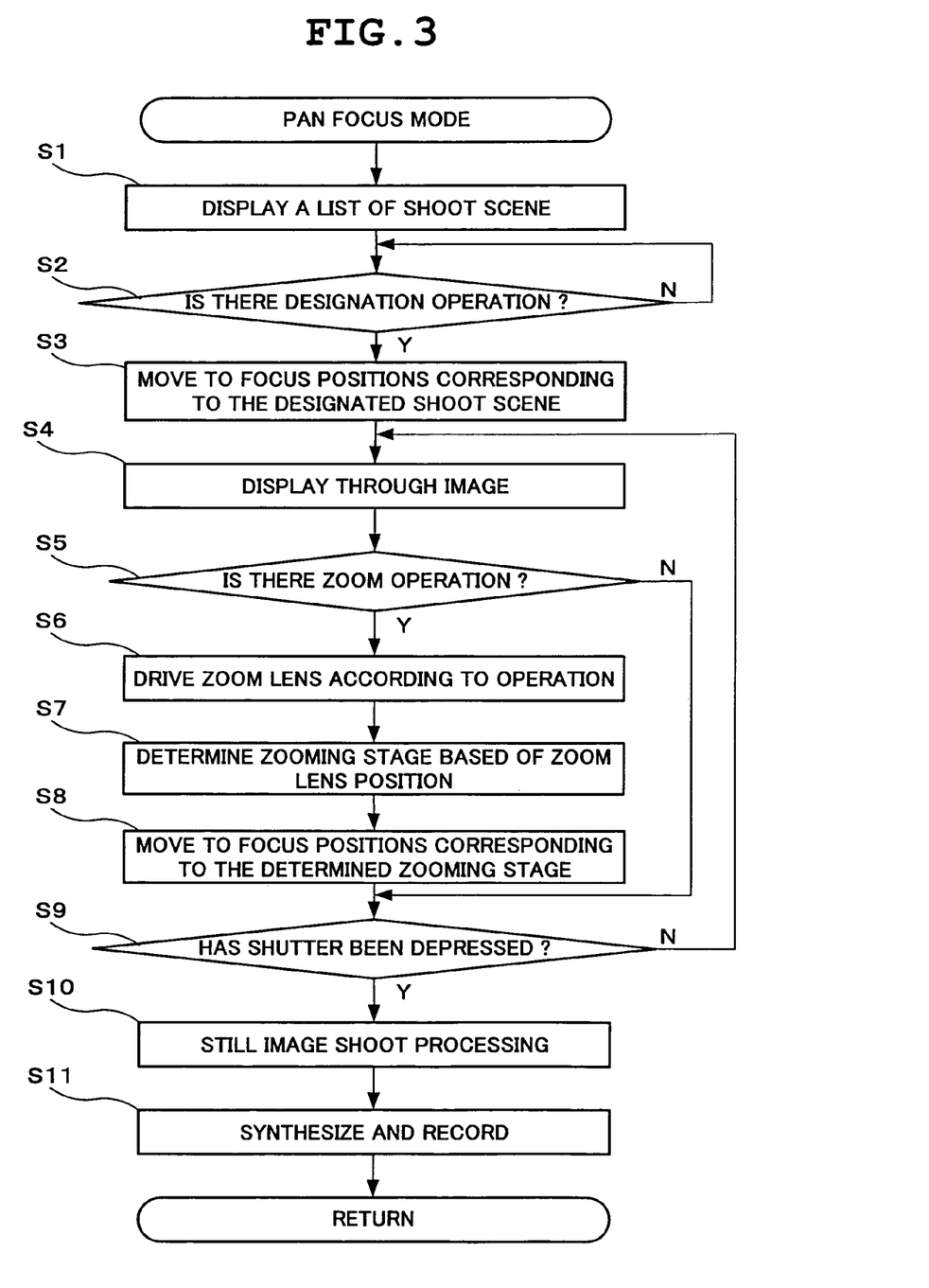
FIG. 3 is a flowchart showing an operation of the digital camera according to a first embodiment.

Next, the operation of the digital camera 1 in the embodiment will be explained according to the flowchart in FIG. 3.

When the mode is set to the pan focus mode by the user's operation of the mode selection key of the key input section 16, a list of the types of the prerecorded shooting scenes is displayed in the image display section 15 (Step S1). The types of the shooting scenes to be displayed include "landscape," "landscape and person," "flower and landscape" and the like.

Next, the CPU 11 judges whether or not the user has performed a designation operation of the shooting scene (Step S2).

If it is judged that the user has performed the designation operation of the shooting scene, the process advances to Step S3, while if it is judged that the user has not performed the designation operation of the shooting scene, the process remains at Step S2 until it is judged that the designation operation has been performed.

At this time, the user can select and designate the shooting scene that matches the desired shooting conditions by operating the plus key and the SET key of the key input section 16.

Specifically, it is possible to select the desired shooting scene by moving a cursor with the operation of the plus key onto the shooting scene which matches the desired shoot condition out of the plurality of shooting scenes of which the list is displayed on the image display section 15, and to designate the shooting scene with the operation of the SET key.

When it is judged that the user has performed the designation operation of the shooting scene, the process advances to Step S3, where the CPU 11 acquires two different pan focus positions corresponding to the thus designated shooting scene, and drives the CCD 6 and the CCD 7 at the thus acquired two pan focus positions, respectively. Note that, since the zoom operation has not yet been performed at this point, the focus positions (CCD positions) corresponding to Zoom 1 and the thus designated shooting scene are to be acquired. Needless to say, in the case where zooming has been performed, the focus position taking into consideration the lens position of the zoom lens is to be acquired.

For example, in the case where the user designates the "landscape and person" as the shooting scene, the focus positions that are acquired from the pan focus position table in the memory 13, are two focus position, i.e., a focus position at which a depth of field is 2.8 m to 5.0 m and a focus position at which a depth of field is 6.0 to ∞ m (since the position is Zoom 1, herein). Accordingly, the CCD 6 is to be moved to one of the thus acquired focus positions and the CCD 7 is to be moved to the other of the thus acquired focus positions.

Accordingly, the optical path length of light of an object image incident to the CCD 6 and the optical path length of light of an object image incident to the CCD 7 are made different, which enables acquiring two pieces of the image data which are in focus on different objects. In this case, it is possible to acquire two pieces of image data which are in focus on a person and a landscape, respectively.

Next, the CPU 11 performs a so called through image display in which it starts imaging of the object picked up by the CCD 6 and the CCD 7, synthesizes two pieces of the image data (through image data) picked up by the CCD 6 and the CCD 7 so as to generate a single piece of the image data (through image data), and then displays the image of the thus generated image data on the image display section 15 (Section S4). Accordingly, since the image data acquired by the CCD 6 and the image data acquired by the CCD 7 are synthesized, a through image in focus on a plurality of objects (the person and the object, herein) can be displayed.

Next, the CPU 11 judges whether or not the user has performed the operation of the zoom key (Step S5). This judgment is based on whether or not the operational signals corresponding to the operation of the zoom key are sent from the key input section 16.

When the CPU 11 judges in Step S5 that the operation of the zoom key has been performed, the CPU 11 moves the zoom lens in the optical axis direction according to the operation by the user (i.e., according to the operational signals that are sent) (Step S6). For example, if the user performs the operation of the "T" key among the zoom keys, the CPU 11 moves the zoom lens in the optical axis direction toward the object, and if the user performs the operation of the "W" key among the zoom keys, the CPU 11 moves the zoom lens in the optical axis direction toward the photographer.

Next, after the CPU 11 moves the zoom lens, it determines the zooming stage based on the lens position of the current zoom lens (Step S7). The lens positions of the zoom lens are classified into seven stages of Zoom 1 to Zoom 7.

Next, the CPU 11 acquires two different focus positions corresponding to the thus determined zooming stage and the shooting scene designated in Step S2, and moves the CCD 6 and CCD 7 to the thus acquired two focus positions, respectively (Step S8), and the process advances to Step S9. This is because when the lens positions of the zoom lenses (the focal lengths) are different, the focus positions will also change.

On the other hand, if it is judged that the zooming operation has not been performed, the process advances to Step S9 as it is.

When the process advances to Step S9, it is judged that whether or not the user has depressed the shutter button. This judgment is made based on whether or not the operational signals corresponding to the user's depression of the shutter button have been sent from the key input section 16.

If it is judged that the shutter button has not been depressed in Step S9, the process returns to Steps S4, and if it is judged that the shutter button has been depressed, the CPU 11 performs still image shoot processing using the CCD 6 and the CCD 7 (Step S10).

Next, the CPU 11 synthesizes a still image data acquired by the CCD 6 and a still image data acquired by the CCD 7, compresses the thus synthesized image data, and records it in the flash memory 14 (Step S11). This operation enables recording image data in focus on a plurality of objects.

A-3. Effect

As described above, in the first embodiment, different two focus positions corresponding to the shooting scene selected by the user and the lens position of the zoom lens are acquired, and the CCD 6 and the CCD 7 are moved to the thus acquired two different focus positions, respectively. Therefore, it is possible to focus on a plurality of objects simply and quickly.

In addition, since the two different focus positions corresponding to the shooting scene are acquired, the focus positions that match the shooting conditions can be acquired. Therefore, it is possible to reliably focus on a plurality of objects you want to shoot.

B. Second Embodiment

Next, a second embodiment will be explained.

B-1. Configuration of the Digital Camera

In the first embodiment, the user selects the shooting scene and moves the CCD 6 and the CCD 7 to the focus positions corresponding to the thus selected shooting scene. In the second embodiment, however, if the user requires quick shooting, the shooting scene is automatically determined and a pan focus is used to focus on a plurality of objects, and if the user does not require quick shooting, contrast AF processing focus on a plurality of objects.

B-2. Operation of Digital Camera

The second embodiment also actualizes the imaging apparatus of the present invention by using the digital camera 1 having a similar configuration.

However, the shutter button of the key input section 16 is a shutter button that enables a half-depression operation and a full-depression operation.

Figure 4:
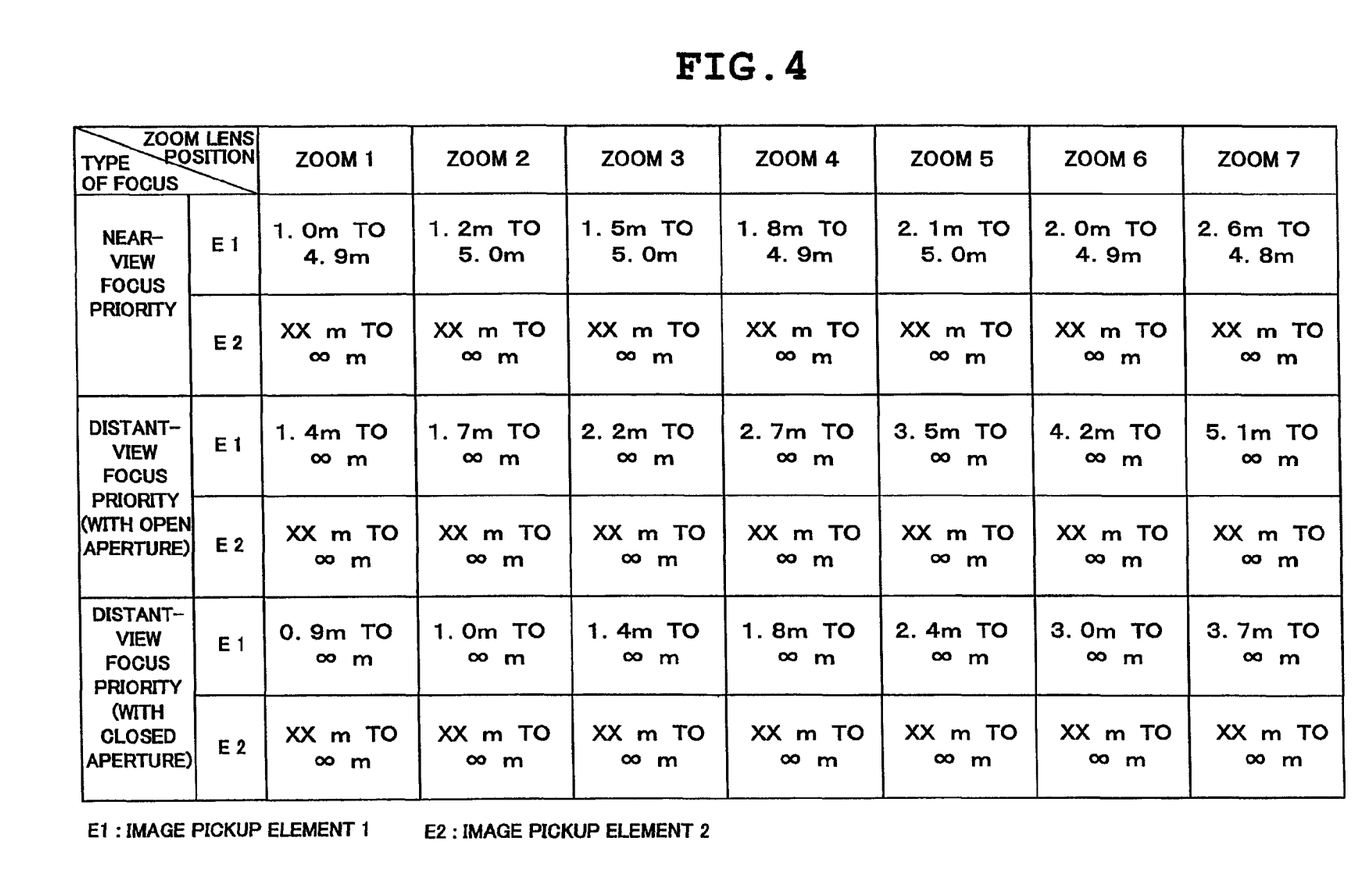
FIG. 4 shows a state of a pan focus position table according to a second embodiment.

In addition, as the pan focus position table in the memory 13, a pan focus table as shown in FIG. 4 is stored in place of the pan focus position table in FIG. 2.

The focus positions of the pan focus corresponding to the type of the focus priority and the lens position of the zoom lens are recorded in the pan focus position table in FIG. 4.

The types of the focus priority consist of a near-view focus priority, a distant-view focus with open aperture and a distant-view focus with closed aperture. The focus position of the pan focus is inevitably determined by the type of the focus priority and the lens position of the zoom lens.

Hereinafter, the operation of the digital camera 1 of the second embodiment will be described with reference to the flow charts of FIG. 5 and FIG. 6.

When the mode is set to the shooting mode by the user's operation of the model selection key of the key input section 16, the CPU 11 starts a so called through image display in which imaging is started by driving either one of the CCD 6 and the CCD 7, and image processing is performed to image data of the imaged object and is stored in the buffer memory, and the thus stored image data is displayed in the image display section 15 (Step S51). It may be possible to also drive the other CCD, thereby starting imaging of the objects with both CCDs (the CCD6 and the CCD 7), synthesizing the image data acquired by one CCD and the image data acquired by the other CCD, and displaying the thus generated image data as the through image.

Next, when the through image display is started, the CPU 11 performs automatic exposure (AE) processing at a focus distance corresponding to the lens position of the current zoom lens, and performs image processing such as white balance processing to the picked up image data (Step S52).

Next, the CPU 11 judges whether or not the user has operated the zoom key of the key input section 16 (Step S53).

When the CPU 11 judges in Step S53 that the operation of the zoom key has been performed, the CPU 11 moves the zoom lens according to the user's operation of the zoom key (Step S54), and the process advances to Step S55. When it is judged in Step S53 that the operation of the zoom key has not been performed, the process advances to Step S55 as it is.

When the process advances to Step S55, the CPU 11 judges whether or not the user has halfway depressed the shutter button. This judgment is made on whether or not the operational signal corresponding to the halfway depression of the shutter button to the key input section 16.

When it is judged that the shutter button has not been halfway depressed, the process returns to S52. If the CPU 11 judges that the shutter button has been halfway depressed, the CPU 11 locks the shooting conditions such as the exposure value (the aperture value, the shutter speed and the amplification factor) for the shooting, white balance value and the like, and judges which of the flash-on mode, the auto strobe mode, the flash-off mode the strobe mode is. In the case of the auto strobe mode, it is judged whether or not the picked-up image is dark using the brightness component of the image data from the currently driven CCD (i.e., the through image acquired just before the halfway depression) or spectroscopy, as well as it is judged whether or not to flash the strobe. The CPU 11 locks the shooting condition on the strobe flash On/Off (Step S56), and starts the timer (Step S57).

Next, the CPU 11 judges whether or not the time is up (Step S58). The judgment whether or not the time is up is made based on whether or not the timer has lapsed a predetermined period of time (0.05 second herein).

When the CPU 11 judges in Step S58 that the time is not up, the CPU 11 judges whether or not the shutter button has been fully depressed (Step S59). This judgment is based on whether or not the operational signal corresponding to the full depression of the shutter button is sent from the key input section 16.

When it is judged that the shutter button has not been fully depressed, the process returns to Step S58.

When the CPU 11 judges that the shutter button has been fully depressed before it judges that time is up, or herein, before 0.05 second has passed after the shutter button has been halfway depressed (Y in Step S59), the CPU 11 judges that quick shooting is required, and performs determination processing of types of the focus priority based on the shooting scene (Step S60). In other words, the CPU 11 automatically judges the current shooting scene and performs determination processing of the type of the focus priority corresponding to the thus judged shooting scene. This determination processing will be later described in detail. The types of the focus priority to be determined include a near-view focus priority, a distant-view focus priority with open aperture and a distant-view focus with closed aperture.

Next, the CPU 11 determines the zooming stage based on the lens position of the current zoom lens (Step S61). The lens position of the zoom lens is classified into seven stages ranging from Zoom 1 to Zoom 7.

Next, the CPU 11 acquires, from the pan focus position table stored in the memory 13, two different focus positions of the pan focus corresponding to the type of the focus priority determined by the determination processing in Step S60 and the thus determined zooming stage (Step S62).

Figure 5:
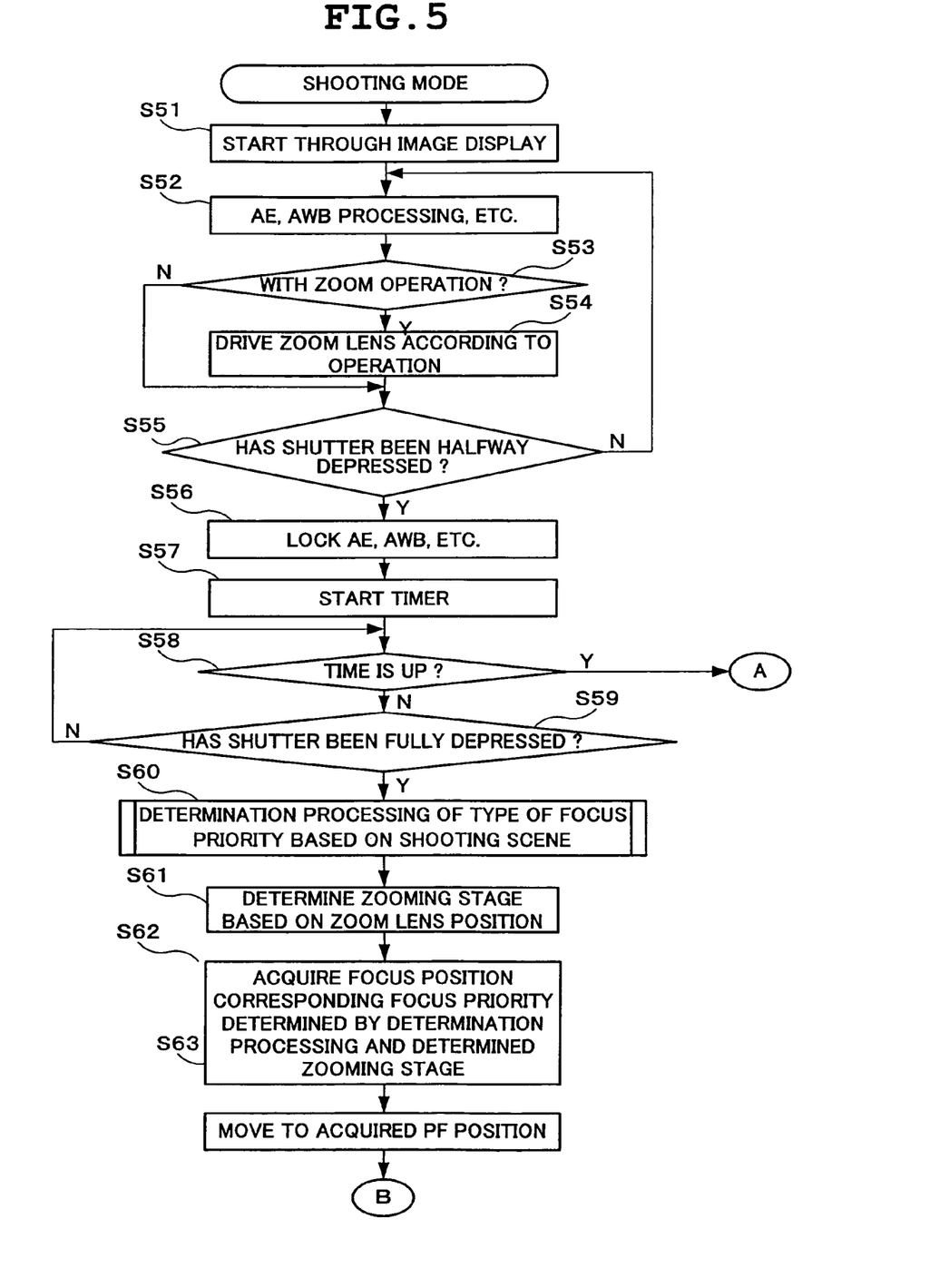
FIG. 5 is a flowchart showing an operation of a digital camera according to the second embodiment.
Figure 6:
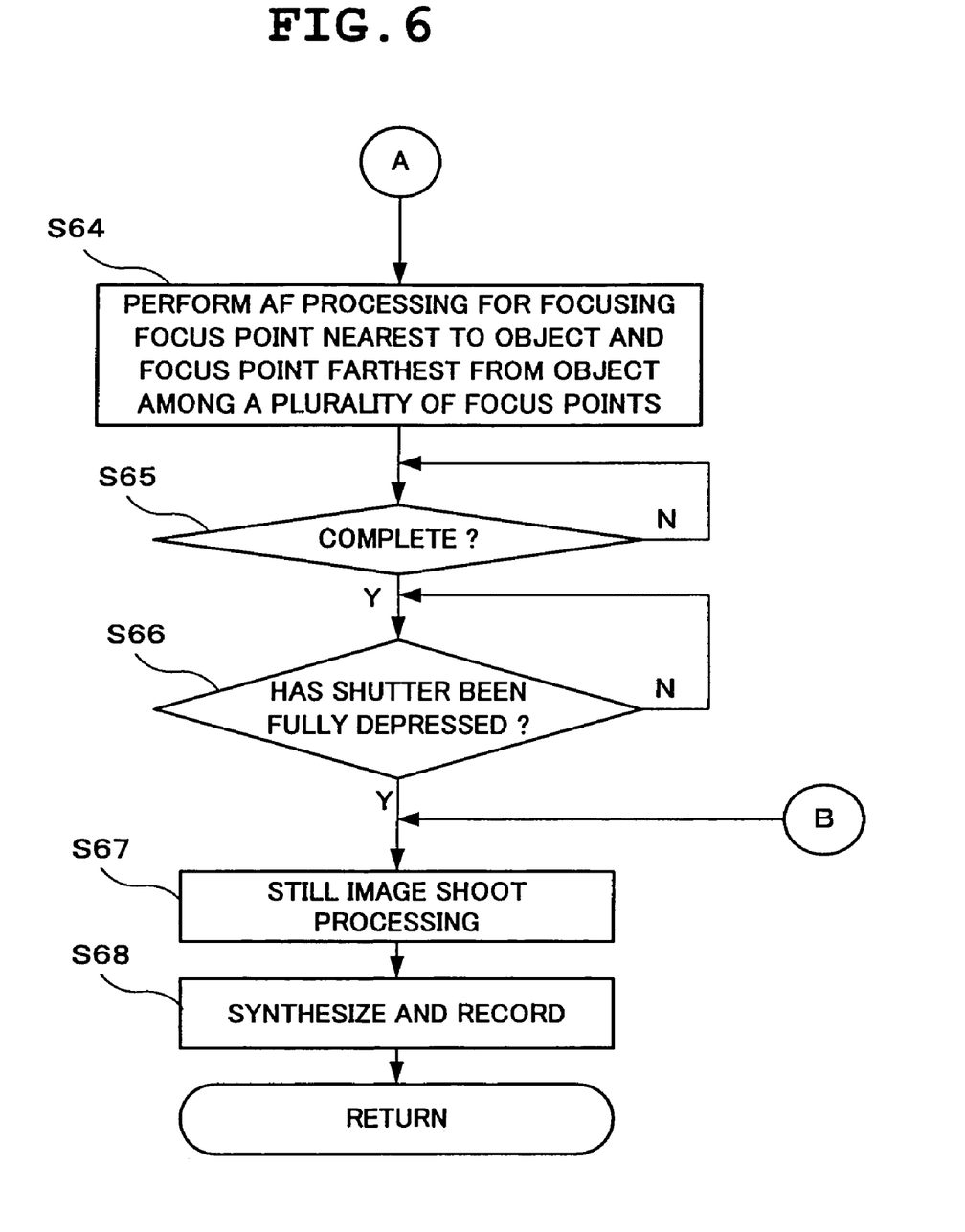
FIG. 6 is a flowchart showing an operation of the digital camera according to the second embodiment.

Next, the CPU 11 drives the CCD 6 and the CCD 7 at the thus acquired two focus positions (Step S63), and the process advances to Step S67 in FIG. 6.

On the contrary, if the CPU 11 judges that the time is up before it judges that the shutter button has been fully depressed (Y in Step S58), the CPU 22 uses the AF processing based on the contrast detection method to perform the AF processing for focusing on the focus point with the nearest to the object and on the focus point which is the farthest from the object point (Step S64 in FIG. 6).

The execution of the AF processing will now be specifically described. The optical path length of the CCD which is now picking up the object is changed within the search range, that is, the CCD is moved in the optical axis direction within the search range, and the AF evaluation values at the respective focus points are detected based on the image pick up signal outputted from the CCD for the respective optical path lengths (i.e., at the positions of the respective CCD), whereby the optical path lengths for which the AF evaluation values peak at the respective focus points are detected, that is, the focus point which is the nearest to the object and the focus point which is the farthest from the object are detected based on the positions of the CCDs. Next, one (the CCD 6 or the CCD 7) of the CCDs is moved to the position at which focus is brought on the thus detected focus point which is the farthest from the object (i.e., the position at which the AF evaluation value of the focus point which is the farthest from the object peaks), and the other CCD (the CCD 7 or the CCD 6) is moved to the position at which focus is brought on the focus point which is the nearest to the object (i.e., the position at which the AF evaluation value of the focus point which is the farthest from the object peaks). Note that, while the AF processing is being performed, the other CCD may be driven and image data acquired by this other CCD may be displayed as the through image on the image display section 15.

Figure 7:
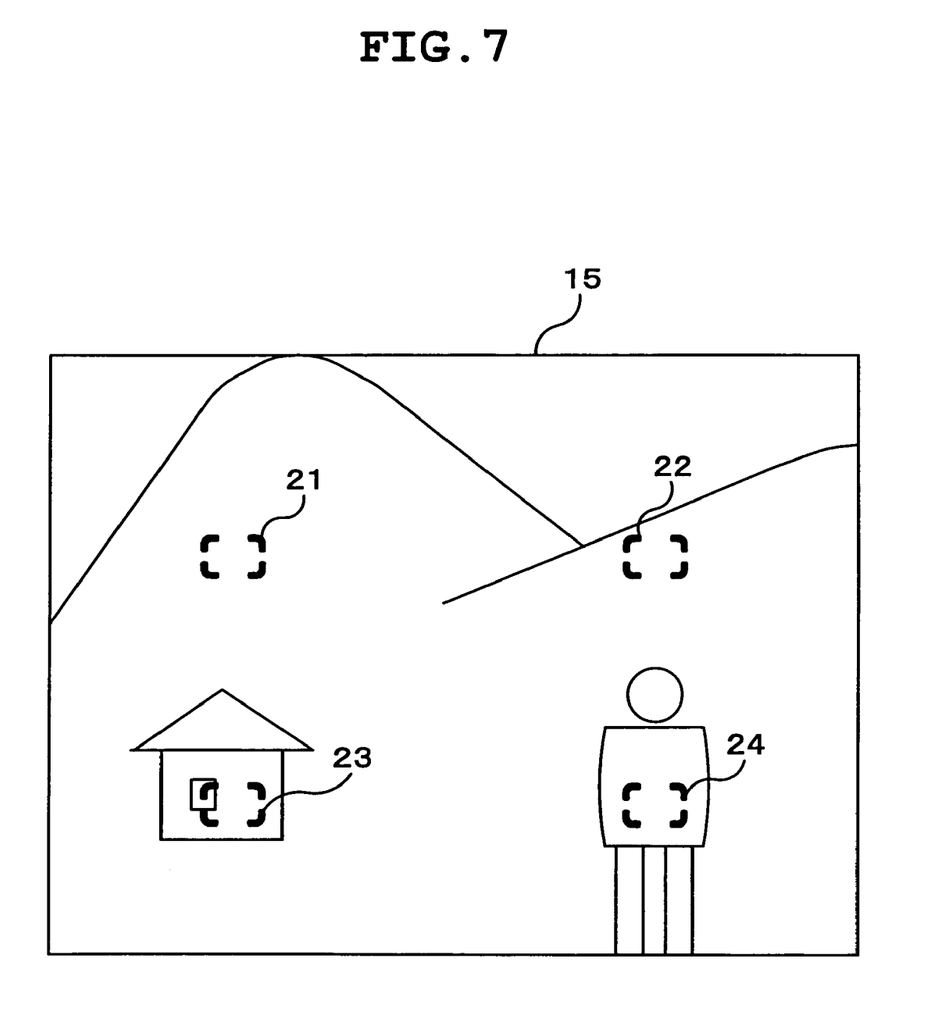
FIG. 7 is an illustration for explaining AF processing in Step S64.

For example, FIG. 7 is a diagram for illustrating the AF processing of Step S64.

As apparent from FIG. 7, a person, a house and two mountains are picked up by the CCDs. A focus frame 21 is positioned at the mountain in the back, a focus frame 22 is positioned at the mountain in the front, a focus frame 23 is positioned at the house, and a focus frame 24 is positioned at the person. Herein, the focus frames refer to the focus points.

In this case, the farthest object is the mountain in the back, and the nearest object is the person. Therefore, one of the CCDs is moved to the position at which focus is on the focus frame 21 positioned at the mountain in the back, and the other CCD is moved to the position at which focus is on the focus frame 24 positioned at the person.

Note that the AF processing of S64 is performed using one of the CCDs which is currently picking up the image. However, both CCDs may be driven, whereby the AF processing is shared by the both CCDs.

Specifically, the optical path lengths at which the AF evaluation values are detected in the AF search range (i.e., the positions of the respective CCDs) are divided and detected by the CCD 6 and the CCD 7, so that the search range is divided.

For example, in the case where there are eight CCD positions at which the AF evaluation value is detected from one end to the other end of the drive range of the CCDs, one of the CCDs detects the AF evaluation values of the focus points at the first, the second, the third and the fourth positions respectively, and the other CCD detects the AF evaluation values of the focus points at the fifth, the sixth, the seventh, and the eighth positions respectively.

Next, the optical path lengths at which the AF evaluation values at the respective focus points peak, that is, the focus point which is the nearest to the object and the focus point which is the farthest from the object are detected based on the positions of the CCDs. Next, one of the CCDs (the CCD 6 or the CCD 7) is moved to the position at which focus is brought on the thus detected focus point which is the farthest from the object (i.e., the position at which the AF evaluation value peaks), and the other CCD (the CCD 7 or the CCD 6) is moved to the position at which focus is brought on the focus point which is the nearest to the object (that is, the position at which the AF evaluation value peaks).

Returning to the flowchart of FIG. 6, after the CPU 11 executes the AF processing, the CPU 11 judges whether or not the Af processing is complete (Step S65).

If it is judged that the AF processing is not complete in Step S65, the process remains at Step S65 until it is judged that the AF processing is complete. If it is judged in Step S65 that the AF processing is complete, it is judged whether or not the user has fully depressed the shutter button (Step S66).

If it is judged in Step S66 that the shutter button has not been fully depressed, the process remains at Step S66 until the shutter button has been fully depressed. If it is judged in Step S66 that the shutter button has been fully depressed, the process advances to Step S67.

Note that after it is judged that the processing of Step S64 is complete (Y in Step S65) and until it is judged that the shutter button has been fully depressed (N in Step S66), the other CCD may also be driven so that the object is picked up by the both CCDs (the CCD 6 and the CCD 7), the image data acquired by one of the CCDs and the image data acquired by the other CCD may be synthesized to generate a single piece of image data, and the thus generated image data may be displayed as the through image. Accordingly, it is possible to display though image focusing on a plurality of objects in the display section 15.

When the CCD 6 and the CCD 7 are moved to the focus positions acquired from the pan focus position table in Step S63, or when it is judged in Step S66 that the shutter button has been fully depressed, the process advances to Step S67, where the still image shoot processing is performed using the CCD 6 and the CCD 7 under the shooting condition which is locked in Step S56 (Step S67).

Next, the CPU 11 synthesizes still image data acquired by the CCD 6 and still image data acquired by the CCD 7, and compresses the thus generated image data and records it to the flash memory 14 (Step S68). This enables recording the image data which is in focus on the plurality of objects.

Next, the determination processing of the types of the focus priority based on the shooting scene will be described with reference to the flow chart in FIG. 8.

Herein, the shooting scene is automatically judged based on whether shooting is made by strobe flash or not, whether shooting is made either with ultra-high illumination or ultra-low illumination or not, whether a flicker has been detected or not, whether shooting is made outdoors or not, or whether an aperture is opened or not. Next, based on the thus determined shooting scene, determination is made on whether or not the focus priority is a near-view focus priority, a distant-view focus priority with open aperture, and a distant-view focus with closed aperture.

Figure 8:
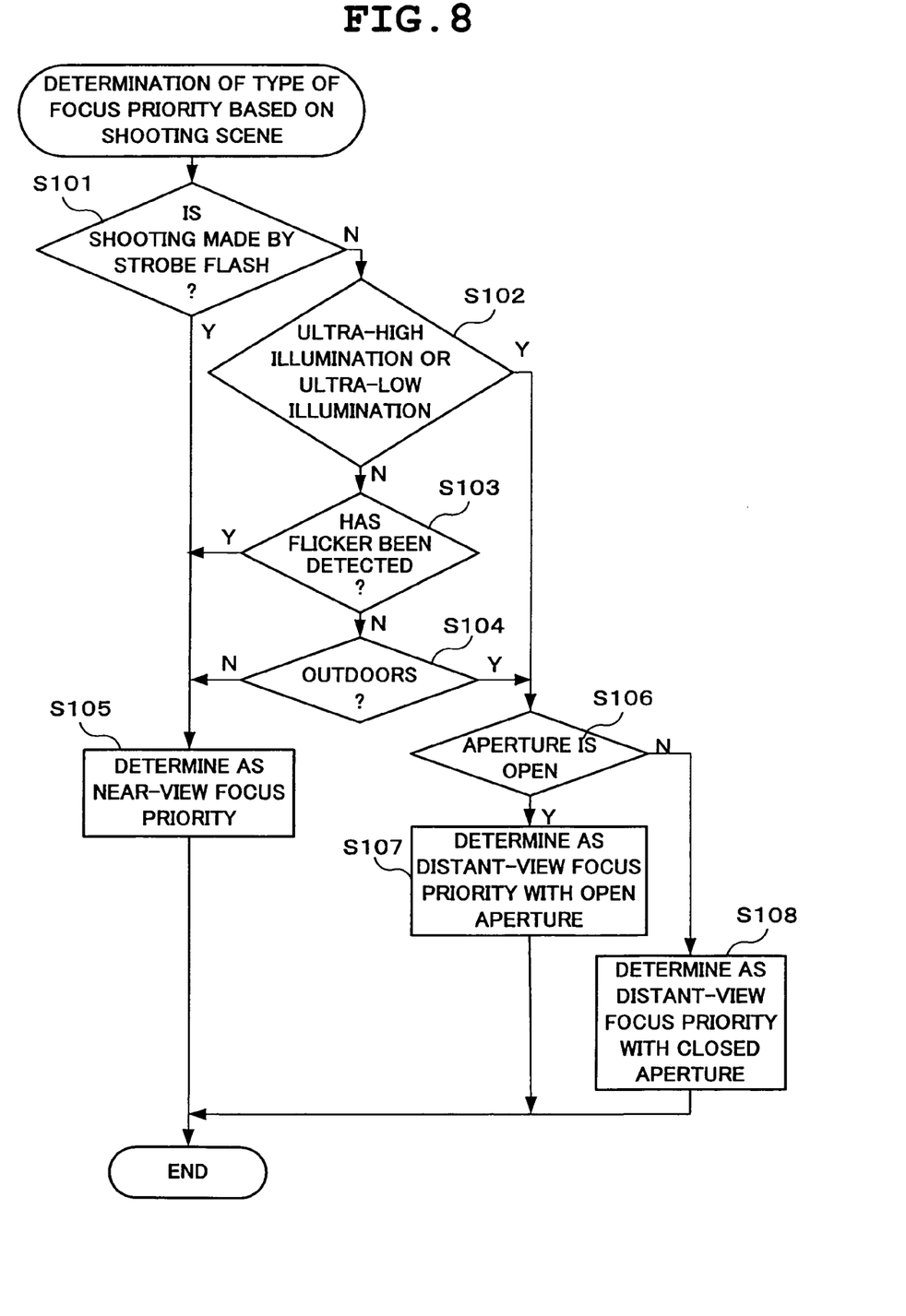
FIG. 8 is a flowchart showing an operation of determination processing of a type of the focus priority based on a shooting scene.

When the process advances to S60 in FIG. 5, it advances to Step S101 in FIG. 8, where the CPU 11 judges whether shooting is made by strobe flash or not. This judgment is made based on the shooting condition locked in Step S56 in FIG. 5.

If it is judged in Step S101 that shooting is made by strobe flash, the process advances to Step S105, and if it is judged in Step S101 that shooting is not made by strobe flash, the process advances to Step S102.

When the CPU 11 judges in Step S101 that shooting is not made by strobe flash and the process advances to Step S102, the CPU 11 judges whether shooting is made either with ultra-high illumination or ultra-low illumination or not based on the through image acquired when the shutter button is fully depressed or halfway depressed. If it is judged that shooting is made either with ultra-high illumination or ultra-low illumination, the process advances to Step S106, and if it is judged shooting is made neither with ultra-high illumination nor ultra-low illumination the process advances to Step S103. The determination on ultra-high illumination or ultra-low illumination is made based on the amount of charge into which the light incident to the CCD is converted.

When it is judged that shooting is made neither with ultra-high illumination nor ultra-low illumination the process advances to Step S103, the CPU 11 judges whether or not a flicker has been detected from the through images acquired when the shutter button is fully depressed. If the flicker has been detected the process advances to Step S105, and if the flicker has not been detected the process advances to S104.

If it is judged that the flicker has not been detected and the process advances to Step S104, it is judged whether shooting is made outdoors or indoors. This judgment is made based on the white balance under the shooting condition locked in Step S56 in FIG. 5. Specifically, if it is judged that a color temperature of a light source acquired by the automatic white balance processing is the color temperature of the sun light, it is judged that shooting is made outdoors, and if a color temperature of a light source acquired by the automatic white balance processing is not the color temperature of the sun light, it is judged that shooting is made indoors. If it is judged in Step S104 that shooting is not made outdoors the process advances to Step S105, and it is judged that shooting is made outdoors, the process advances to Step S106.

In the case where it is judged in Step S102 that shooting is made by strobe flash, in the case where it is judged in Step S103 that a flicker has been detected, or in the case where it is judged in Step S104 that shooting is not made outdoors, it is determined that focus priority is the near-view focus priority (Step S105).

On the contrary, in the case where it is judged in Step S102 that shooting is made either with ultra-high illumination or ultra-low illumination, or in the case where it is judged in Step S104 that shooting is made outdoors, the process advances to Step S106, where it is judged whether the aperture is open or not. This judgment is made based on the shooting condition locked in Step S56 in FIG. 5.

If it is judged in Step S106 that the aperture is open, it is judged that focus priority is the distant-view focus priority with open aperture (Step S107), and if it is judged that the aperture is not open, it is judged that focus priority is the distant-view focus priority with closed aperture (Step S108).

After the type of the focus priority is determined, the process advances to Step S61 in FIG. 5.

As described above, the type of the focus priority is determined based on the shooting scene.

B-3 Effect

As descried above, in the second embodiment, when the shutter button is fully depressed without stopping, it is judged that quick shooting is required. Accordingly, the shooting scene is automatically judged and the focus priority is judged based on the thus judged shooting scene, and further, two different focus positions corresponding to the type of the thus judged focus priority and the lens position of the zoom lens are acquired. Accordingly, it is possible to focus on a plurality of objects simply and quickly.

In addition, the shooting scene is automatically judged, and two focus positions that are different depending on the shooting scene are acquired, which enables acquiring the focus positions that match the shooting status and focusing on a plurality of objects that are to be photographed.

In addition, when the shutter button is halfway depressed, it is judged that quick shooting is not required, and the focus point which is the farthest from the object and the focus point which is the nearest to the object are detected based on the positions of the CCDs at which the AF evaluation values peak at the respective focus points, thereby the farthest object and the nearest object are brought into focus. Accordingly, it is possible to reliably focus on a plurality of objects, and it is possible to focus on a plurality of objects in a wider range.

C. Modifications

The modifications as follows are also possible for each of the embodiments as described above.

(1) In the first embodiment as described above, a plurality of shooting scenes are provided. However, it is possible to provide only one shooting scene. In this case, when the user does not select the shooting scene, the user sets the mode to the pan focus mode and the individual CCDs are automatically moved to predetermined respective focus positions.

In addition, in the first embodiment, the user selects any shooting scene out of a plurality of shooting scenes by manual operation. However, as in the case of the second embodiment, the shooting scene may be automatically judged, and the respective CCDs may be moved to the respective focus positions corresponding to the automatically judged shooting scene.

In addition, in the first embodiment, a list of the shooting scenes is displayed corresponding to the setting of the pa focus mode. However, the list of the shooting scenes may be displayed by the user's key operation of menu keys or the like at any timing during the through image display.

In addition, in the second embodiment, the shooting scene is automatically judged and the respective CCDs are moved to the respective focus positions corresponding to the automatically judged shooting scene. However, it is also possible to move the respective CCDs to the respective predetermined focus positions when the shutter button is fully depressed without stopping, or it is possible to move the respective CCDs to the respective focus positions which are manually set by the user in advance.

(2) In addition, in each of the embodiments described above, the focus positions corresponding to the lens position of the zoom lens and the shooting scene (including the type of the focus priority in the second embodiment) are recorded in the pan focus position table. However, it is also possible to record the focus positions corresponding only to the shooting scene. In this case, in the case where the optical zoom is performed, the focus positions may be determined by calculation taking into consideration the zoom magnification (the lens position of the zoom lens) and the like.

(3) In addition, in each of the embodiments described above, the focus positions are recorded in the pan focus position table. However, some information for calculating the focus positions (for example, the information related to the depth of field) may be recorded, and the focus positions may be determined by calculation according to the information.

(4) In addition, in each of the embodiments described above, the focus positions of the pan focus for the respective image pickup elements are recorded in the pan focus position table. However, it is possible to have a table in which a plurality of focus positions that serve as sampling points for detecting the AF evaluation values for the respective image pickup elements for the respective shooting scene so as to perform the AF processing based on the simple contrast detection method (simplified AF) in place of the pan focus.

FIG. 9 shows a state of a table in which a plurality of focus positions (the positions of the CCDs) that serve as sampling points corresponding to the type of the focus priority and the zooming stage.

In the FIG. 9, the expression of "XX m TO YY m" is used in setting an optimal focus position.

For example, in the case of a distant-view focus priority with open aperture and in the case where the lens position of the zoom lens 2b is Zoom 3, there are three focus positions that serve as sampling points of an image pickup element 1 (one of the image pickup elements) are: a focus position at which the depth of field is 1.2 m to 2.2 m, a focus position at which the depth of field is 1.6 m to 4.6 m, and a focus position at which the depth of field is 2.5 m to ∞ m.

In this case, when the CPU 11 performs determination processing of the type of the focus priority based on the shooting scene in Step S60 in FIG. 5, and determines the zooming stage based on the lens position of the current zoom lens in Step S61, the CPU 11 acquires a plurality of focus positions that serve as sampling points for the respective image pickup elements from the table in FIG. 9, based on the type of the focus priority which is determined by the determination processing and on the thus determined zooming stage.

In this case, for example, the type of the focus priority determined by the determination processing is a distant-view focus priority with open aperture and the determined zooming stage is Zoom 3, the sampling points of the AF evaluation value detected by one of the image pickup elements are three points; a focus point at which the depth of field is 1.2 m to 2.2 m, a focus point at which the depth of field is 1.6 m to 4.6 m, and a focus point at which the depth of field is 5 m to ∞ m.

In addition, when the CPU 11 acquires the focus positions that serve as the sampling points for the respective image pickup elements, the CPU 11 performs simplified AF based on the thus acquired sampling points for the respective image pickup elements. Specifically, the sampling points for detecting the AF evaluation values for the respective image pickup elements are limited to the thus acquired focus positions, and the CCD is driven to the focus position out of the focus positions at which the AF evaluation value peak.

Specifically, the CCD 6 is moved to the sampling points (three focus positions) for one of the image pickup elements acquired from the table in FIG. 9, whereby the AF evaluation values of the respective focus points at the three focus positions are detected, and the CCD 6 is moved to the focus position at which the AF evaluation value peaks.

In the same way, the CCD 7 is moved to the sampling points (three focus positions) of the other image pickup elements acquired by the table in FIG. 9, whereby the AF evaluation values of the respective focus points at the three focus positions are detected, and the CCD 7 is moved to the focus position at which the AF evaluation value peaks.

At this time, since the CCD 6 and the CCD 7 have different detection sampling points, it is possible to focus on different objects.

In this case, the number of the focus positions that serve as the scan representative positions is three. However, as long as the number is plural, two focus positions or four focus positions may be used. In other words, it is acceptable as long as the number of the sampling points for detecting the AF evaluation value is smaller than the AF processing based on the ordinary contrast detection method.

In addition, the focus positions that serve as the sampling points for detecting the AF evaluation values for the respective image pickup elements for the respective shooting scene are recorded in the table of FIG. 9. However, the positional range of the image pickup elements that show the search range for detecting the AF evaluation values for the respective image pickup elements for the respective shooting scenes, or the sampling interval for detecting the AF evaluation value may be recorded. In this case, the search range is made smaller, or the sampling interval is made larger than the AF processing based on the ordinary contrast detection method.

Also for the first embodiment, in place of the table in FIG. 2, the modification may have a table in which a plurality of focus positions that serve as sampling points for detecting the AF evaluation value for the respective image pickup elements for the respective shooting scenes, the positional range of the image pickup elements that show the search range for detecting the AF evaluation values, or the sampling interval for detecting the AF evaluation value may be recorded (5) In each of the embodiments described above, the optical path length is changed by moving the CCDs 6 and 7 in the optical axis direction. However, the optical path lengths for the individual CCDs may be changed by providing a focus lens for individual CCDs and moving the individual focus lenses. In other words, whatever may change the optical path lengths for the individual CCDs is acceptable.

(6) In addition, in each of the embodiments as described above, light incident from one image pickup lens 2 is split by the optical path split means so that light of an object image is projected to the CCD 6 and the CCD 7. However, an image pickup lens may be provided for the individual CCDs so as to project light of an object image to the CCDs.

(7) In addition, in each of the embodiments as described above, two CCDs (the CCD 6 and the CCD 7) are used to actualize the present invention. However, the number of the CCDs is not limited to two, and three or four CCDs may be provided. That is, as long as the number of the CCDs is plural, any number of CCDs may be provided. When the number of the CCDs increases, it is possible to focus on more objects.

In this case, a focus position table in which the focus positions for the respective CCDs for the respective shooting scenes or the like is provided.

(8) In addition, in each of the embodiments described above, a single piece of image data is generated by merely synthesizing the image data outputted from a plurality of CCDs. However, a single piece of image data may be generated by cutting out the image data of a section in which the focus is most adjusted and synthesizing such image data.

(9) In addition, in the second embodiment as described above, the shutter button has a two-stage stroke enabling the halfway-depression operation and the full-depression operation. However, a button which enables a one-stage operation only (a button which does not have a two-stage stroke, that is, a button which can be only depressed) may be used. In this case, a touch sensor is provided on the top potion of the shutter button for detecting whether or not a finger has touched it. By detecting that a finger touches the touch sensor, it is judged that the shutter button has been halfway depressed, and by the fact that the shutter button is pressed down it is judged that the shutter button has been fully depressed.

(10) In addition, in the second embodiment as described above, in the case where the shutter button is fully depressed (Y in Step S59) before a predetermined time has lapsed after the shutter button is halfway depressed, it is judged that the user has fully depressed the shutter button without stopping. However, in the case where the CPU 11 does not detect an operational signal corresponding to the halfway depression of the shutter button unless the halfway depression state of the shutter button is maintained for a certain period of time, the operational signal corresponding to the halfway depression of the shutter button may not be detected. Further, in the case where only the operational signal corresponding to the full depression of the shutter button is detected, it may be judged that the user fully depressed the shutter button without stopping.

Specifically, if it is judged in Step S55 that the shutter button has not been halfway depressed, it is judged whether or not the shutter button has been fully depressed. If it is judged the shutter button has not been fully depressed either, the process returns to Step S52. On the other hand, in the case where the operational signal corresponding to the halfway depression is detected, the shooting conditions such as AE, AWB are locked, and the process advances to Step S64. In addition, in the case where the operational signal corresponding to the halfway depression is not detected but the operational signal corresponding to the full depression of the shutter button is detected, the shooting conditions such as AE, AWB are locked and the process moves to Step S60.

(11) In addition, in the second embodiment as described, in the case where a predetermined time period has lapsed without the shutter button being fully depressed after it is judged that the shutter button has been halfway depressed (Y in Step S58), the AF processing in Step S64 is performed. However, after the shutter button has been halfway depressed, the process may immediately advance to Step S64, where the AF processing may be performed. Next, when it is judged that the shutter button has been fully depressed before it is judged that the AF processing is complete (before branched to Y in Step S65), the AF processing of Step S64 may be cancelled and the process may advance to Step S60.

(12) In addition, in the second embodiment, when t is judged that the shutter button has been fully depressed without stopping, the current shooting scene is automatically judged, the determination processing of the type of the focus priority corresponding to the thus determined shooting scene, and the focus positions are acquired according to the determination processing. However, the user may in advance randomly select a shooting scene out of a plurality of shooting scenes and set it as the shooting scene for full depression of the shutter button. In this case, when it is judged that the shutter button has been fully depressed without stopping, a plurality of different focus positions may be acquired corresponding to the thus set shooting scene so as to focus on the object.

(13) In addition, the digital camera 1 in the embodiments as described above is not limited to one used in the embodiments as described above. It may be a cell phone with camera, a PDA with camera, a PC with camera, an IC recorder with camera, or digital video camera, or the like. In short, any equipment which enables focusing on the object is acceptable.

(14) In the present embodiments, the expression "a focus position at which the depth of field is 2.8 m to 5.0 m" is used to represent a focus position stored in the pan focus position table. However, this expression is an example for a camera having a particular aperture position. When the aperture position changes, the width of the field of depth of the object also changes, and the focus position will accordingly change.

In the case of camera equipment enabling changing the aperture position, a plurality of focus positions may be recorded corresponding to the respective aperture positions.

Furthermore, although the program of the digital camera which is a preferred embodiment of the present invention is stored in the memory (for example, ROM, etc.) of the digital camera, this program is stored on a computer-readable medium and should also be protected in the case of manufacturing, selling, etc. of only the program. In that case, the method of protecting the program with a patent will be realized by the form of the computer-readable medium on which the program is stored.

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
split means for splitting an optical path of light of an object;
a plurality of image pickup elements respectively positioned at different optical path lengths from the split means;
optical path length change means for independently changing respective optical path lengths of respective light of an object image incident on the plurality of image pickup elements;
focus position information storing means for storing plural shooting scenes and a plurality of different focus position information items corresponding to each shooting scene;
a shutter button enabling a halfway depression operation and a full depression operation;
first judgment means for judging whether the shutter button has been halfway depressed;
second judgment means for judging whether the shutter button has been fully depressed within a predetermined time after the judgement by the first judgment means that the shutter button has been halfway depressed;
acquisition means for, when the second judgment means judges that the shutter button has been fully depressed within the predetermined time, acquiring the plurality of different focus position information items corresponding to an automatically judged shooting scene at the time of the judgement by the second judgement means, the automatically judged shooting scene being one of the stored plural shooting scenes; and
focus control means for focusing on the object by controlling the independent changing of the respective optical path lengths of the respective light incident on the respective image pickup elements using the optical path length change means, based on the plurality of different focus position information items acquired by the acquisition means.

2. The imaging apparatus according to claim 1, further comprising:
optical zoom magnification setting means for setting an optical zoom magnification;
optical zoom means for moving a zoom lens based on the optical zoom magnification set by the optical zoom magnification setting means; and
position information acquisition means for acquiring lens position information of the zoom lens, wherein the acquisition means acquires the plurality of different focus position information items corresponding to the position information of the zoom lens acquired by the position information acquisition means.

3. The imaging apparatus according to claim 1, further comprising selection means for selecting one shooting scene out of the plurality of shooting scenes; and
wherein the acquisition means acquires the plurality of different focus position information items based on the shooting scene selected by the selection means.

4. The imaging apparatus according to claim 3, further comprising designation means for enabling a user to designate the shooting scene; and
wherein the selection means selects the shooting scene designated by the designation means.

5. The imaging apparatus according to claim 3, further comprising auto judgment means for automatically judging the shooting scene; and
wherein the selection means selects the shooting scene judged by the auto judgment means.

6. The imaging apparatus according to claim 5, wherein the auto judgment means automatically judges the shooting scene, based on judgments of at least one of: (i) whether shooting is made by strobe flash, (ii) whether shooting is made with one of ultra-high illumination and ultra-low illumination, (iii) whether a flicker has been detected, (iv) whether shooting is made outdoors, and (v) whether an aperture is opened.

7. The imaging apparatus according to claim 5, further comprising determination means for determining a type of a focus priority based on the shooting scene judged by the auto judgement means; and
wherein the acquisition means acquires the plurality of different focus position information items depending on the type of the focus priority determined by the determination means.

8. The imaging apparatus according to claim 1, further comprising contrast AF control means for, when the first judgment means judges that the shutter button has been halfway depressed, performing auto focus on the object by detecting an AF evaluation value of respective focus points based on image data outputted by at least one of the image pickup elements at the respective optical path lengths, and by controlling the changing of the respective optical path lengths using the optical path length change means such that the respective optical path lengths correspond to highest AF evaluation values out of the detected AF evaluation values of the respective focus points.

9. The imaging apparatus according to claim 8, wherein the contrast AF control means focuses at least at a focus point which is positioned at a farthest focus object and at a focus point which is positioned at a nearest focus object.

10. The imaging apparatus according to claim 8, further comprising:
   third judgment means for judging whether the shutter button has been fully depressed before the AF control performed by the contrast AF control means is complete; and
   focus switching means for, when the third judgment means judges that the shutter button has been fully depressed before the AF control is complete, canceling the AF control performed by the contrast AF control means and executing the focus control performed by the focus control means.

11. The imaging means according to claim 1, further comprising generation means for generating a single image data by synthesizing a plurality of image data respectively acquired by the plurality of image pickup elements.

12. The imaging apparatus according to claim 1, further comprising contrast AF means for performing auto focus on the object by changing the respective optical path lengths of the respective light incident on the respective image pickup elements by: (i) detecting AF evaluation values for the image pickup elements based on image data outputted by the image pickup elements, (ii) identifying the respective optical path lengths for the respective image pickup elements based on highest AF evaluation values of the detected AF evaluation values, and (iii) controlling the respective optical path lengths of the respective light incident to the respective image pickup elements; and
   wherein the focus control means focuses on the object by controlling the changing of the respective optical path lengths of the respective light incident on the respective image pickup elements using the optical path length change means, thereby setting the respective identified optical path lengths.

13. The imaging apparatus according to claim 12, wherein each of the plurality of different focus position information items acquired by the acquisition means has a predetermined sampling interval.

14. The imaging apparatus according to claim 12, wherein each of the plurality of different focus position information items acquired by the acquisition means is information indicating a search range for detecting AF evaluation values.

15. A non-transitory computer-readable recording medium having stored thereon a program that is executable by an imaging apparatus which comprises a split unit for splitting an optical path of light of an object, a plurality of image pickup elements respectively positioned at different optical path lengths from the split unit, a focus position information storing unit for storing plural shooting scenes and a plurality of different focus position information items corresponding to each shooting scene, and a shutter button enabling a halfway depression operation and a full depression operation, the program being executable by the imaging apparatus to perform functions comprising:
   independently changing respective optical path lengths of respective light of an object image incident on the plurality of image pickup elements;
   judging whether the shutter button has been halfway depressed;
   judging whether the shutter button has been fully depressed within a predetermined time after it is judged that the shutter button has been halfway depressed;
   when it is judged that the shutter button has been fully depressed within the predetermined time, acquiring the plurality of different focus position information items corresponding to an automatically judged shooting scene at the time of the judgement that the shutter button has been fully depressed within the predetermined time, the automatically judged shooting scene being one of the stored plural shooting scenes; and
   focusing on the object by controlling the independent changing of the respective optical path lengths of the respective light incident on the respective image pickup elements, based on the acquired plurality of different focus position information items.

* * * * *